Jan. 26, 1937. E. CONTI 2,068,908
DISPENSING DEVICE
Filed Sept. 8, 1934  2 Sheets-Sheet 1
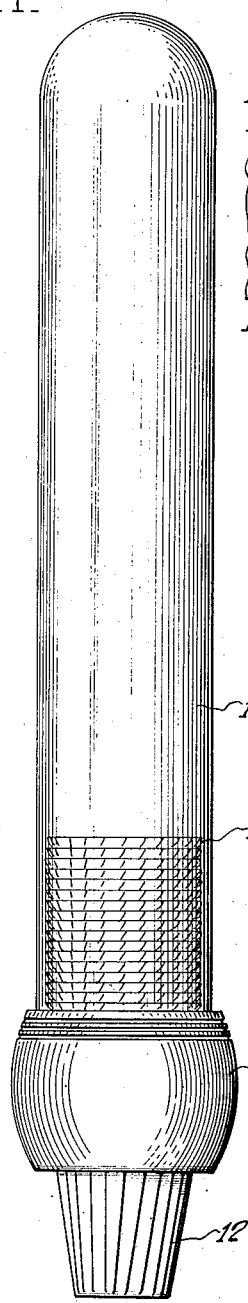
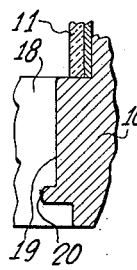
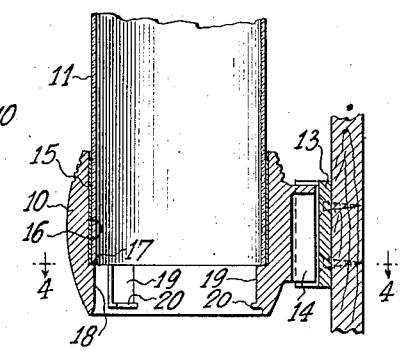
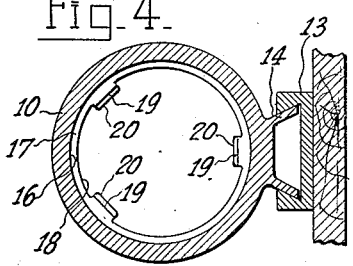
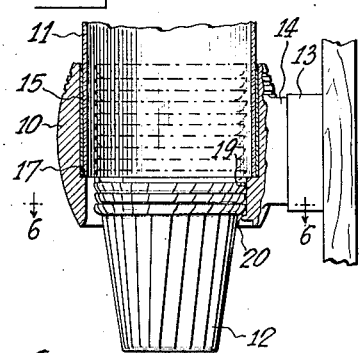
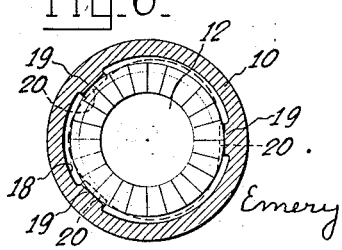
INVENTOR
EUGENE CONTI.
BY
Emery, Booth, Varney & Whittemore
ATTORNEYS Jan. 26, 1937.  E. CONTI  2,068,908
DISPENSING DEVICE
Filed Sept. 8, 1934   2 Sheets-Sheet 2
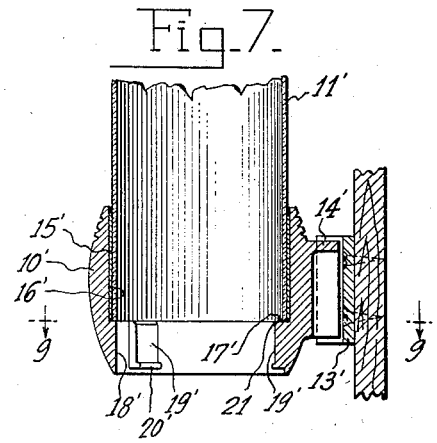
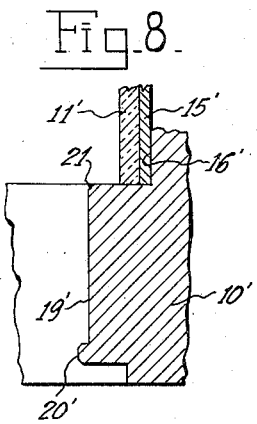
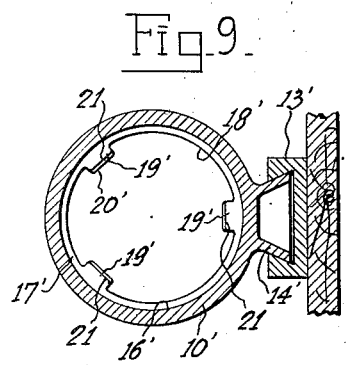
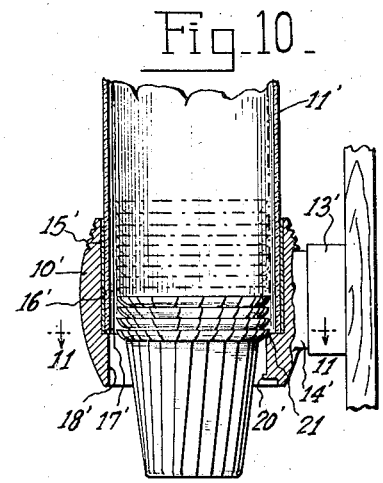
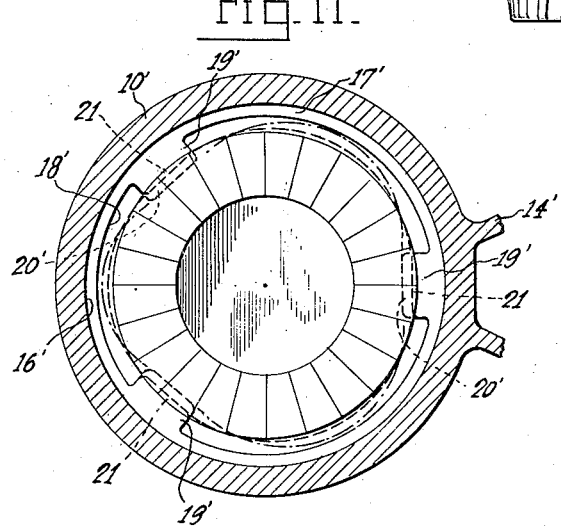
INVENTOR
EUGENE CONTI.
BY
Emery, Booth, Varney & Whittemore
ATTORNEYS Patented Jan. 26, 1937

2,068,908

UNITED STATES PATENT OFFICE 2,068,908

DISPENSING DEVICE

Eugene Conti, Mount Vernon, N. Y., assignor to Herz Cup Company, Incorporated, New York, N. Y., a corporation of New York Application September 8, 1934, Serial No. 743,220

5 Claims. (Cl. 312—43)

This invention relates to dispensing devices, particularly to dispensing devices which are suitable for delivering objects with narrow resilient beads, such as paper cups, and has for an object the provision of improvements in this art.

The invention is shown in illustrative embodiment in the accompanying drawings, wherein:

Fig. 1 is a front elevation of the device in operative position;

Fig. 2 is a central vertical section with the articles removed;

Fig. 3 is an enlarged partial section of parts shown on the right hand side of Fig. 2;

Fig. 4 is a horizontal section taken on the line 4—4 of Fig. 2;

Fig. 5 is a vertical section similar to Fig. 2 showing cups in the device;

Fig. 6 is an enlarged horizontal section taken on the line 6—6 of Fig. 5;

Fig. 7 is a vertical section showing a modification;

Fig. 8 is an enlarged partial section of parts shown on the right hand side of Fig. 7;

Fig. 9 is a horizontal section taken on the line 9—9 of Fig. 7;

Fig. 10 is a vertical section similar to Fig. 7 showing cups being dispensed; and Fig. 11 is an enlarged section taken on the line 11—11 of Fig. 10.

Referring to Figs. 1-6 of the drawings, the device comprises a tubular body 10 for dispensing articles and a dome 11 of any suitable material, for example glass, for enclosing a stack 12 of the articles. As herein shown, a stack of nesting plaited paper cups is carried in the device and the lower end of the stack projects below the lower end of the device sufficiently to permit the body of the bottom cup to be grasped by the hand. The device may be mounted in any suitable manner as by a bracket 13 attached to a convenient anchorage. The joint between the supporting lug 14 and the bracket 13 may be of the well known key and slot type to permit the device to be readily placed or removed.

The lower end of the dome 11, which may be provided with a band 15 of cushioning material such as paper or the like is received in a tubular socket 16 formed in the upper end of the body 10. The lower end of the dome rests on an offset annular seat 17 formed at the upper end of a lower tubular portion 18.

At intervals about the circumference of the lower tubular portion 18 there are provided ribs 19 long enough to guide several of the articles being dispensed. At the lower ends of the ribs 19 article supporting and dispensing ledges 20 are provided. Preferably the ribs and ledges are formed as rigid integral parts of the body.

The ribs 19 in this modification are arranged to confine the rims of the cups fairly closely but without binding. As shown, the inner faces of the ribs lie approximately in the surface of a right cylinder. The ledges 20, which are disposed in a common horizontal plane, project inward sufficiently to securely support the stack of articles against accidental displacement and to cause a pronounced distortion in the resilient rim of the lowermost cup when it is being pulled out. The ribs and ledges are relatively narrow in a circumferential direction and are spaced a sufficient distance apart to permit the required outward distortion of the rim of the cup. The inside diameter of the lower tubular portion 18 is made large enough to permit this distortion of the rim. As illustrated, the present device comprises three ribs and three corresponding ledges. The ledges are made relatively thin in an axial direction to permit the cup dispensed to pass quickly without binding the bodies of the upper cups which are nested therein. This avoids the tendency to dispense more than one cup at a time.

In Fig. 6 the rim of a cup in normal position resting on the ledges is shown in full lines and the cup in distorted position passing the dispensing ledges is shown in dotted lines.

Figs. 7 to 11 show a modification of the dispenser in which the dispensing action is made easier, particularly when the articles are pulled out straight along the axis of the dispenser.

Most pull-out cup dispensers are designed to have the cups pulled out by a sidewise movement and since there does not appear to be any natural tendency of users to take the cups in this manner, the dispensers are often marked with directions to pull the cups sidewise or to first pull forward and then push backward.

The necessity for this may be explained by considering the action which takes place when the bottom cup of a stack of nested cups is dispensed. First, it must be noted that as the cups come from the factory and as they are put into the dispenser they are very tightly nested and fit each other very closely. Second, it is to be noted that in a pull-out dispenser the outer cup must be taken so it must have its body exposed for the hand to grasp, as distinguished from mechanical dispensers which usually remove the inner cup. In the latter case it is only necessary to engage the edge of the rim and push the cup in an axial direction; but in the former case with pull-out dispensers the action is not quite so simple because the rim, if it has any appreciable body and strength, must be distorted or pressed inward in order to pass the obstruction which constitutes the dispensing element to pass one cup and hold back the rest of the stack. If only the distortion of a single rim were considered the cup could be pulled past the obstructions with ease; but since the cups are tightly nested an inward distortion of the rim of the outer cup entails a distortion of the side walls of all the cups which lie within it. The greater the distortion, the greater the force required to pull out the cup. And if the dispensing elements are made large enough to hold the stack back with certainty they will be so large as to produce considerable distortion in the rim of the cup being dispensed. By using the sidewise pull or rocking motion in taking a cup the distortion and pull are greatly reduced; but even when directions are printed plainly on the dispenser, there will still be a surprising number of persons who through lack of observation, inattention or illiteracy will not follow instructions and will crush a number of cups before they remove one suitable for use.

The modification shown in Figs. 1 to 6 and described above is of the type which operates best when the cups are pulled out with a rocking motion; the modification shown in Figs. 7 to 11 and now to be described is adapted to dispense cups properly and in perfect shape no matter in what manner they are pulled out, even when pulled straight down.

In general shape and configuration this dispenser resembles that of Figs. 1 to 6 but departs therefrom in the proportion of parts with respect to each other and with respect to the cups. As before, it comprises a tubular body 10', a glass container dome 11', bracket 13', supporting lug 14', cushioning band 15', dome socket 16', offset annular dome seat 17', lower tubular portion 18', ribs 19' and ledges 20'.

In the present modification, however, the ribs 19' are made thicker radially than before, that is, their inner surfaces lie on a smaller circle, so that the stack of cups is normally supported on upper ledges 21 at the upper ends of the ribs. The lower ledges have their inner edges on a circle of about the same size as before but they project less from the ribs because the ribs have been made thicker. The circle defining the inner surfaces of the ribs is made only slightly smaller than the outer circumference of the rims of the cups so that only a very slight distortion of a rim is required to pass the upper ledges 21. In fact, the upper ledges 21 extend so little beyond the outer edges of the rims that there is no positive assurance that the stack will not at times follow down to the lower ledges 20', although in use it is found that this seldom occurs. However, the sizes are so chosen that if it does occur the stack will not be wedged so tightly that the dispensing action cannot continue without noticeable change so far as the user is concerned. The slight distortion of the few lowermost cups in the ribs will exert a separating action on the tapered bodies of the upper cups of the stack disposed therein tending to separate them and force them upward until presently a rim will rest securely on the upper ledges to support the stack thereon and cause resumption of normal operation. The lower ledges give complete assurance that only a single cup will be pulled out at a time and that the stack as a whole will never be pulled out.

The lower ledges are so narrow radially that the secondary dispensing action on a single cup, either when passing out alone or when being pulled out from the temporarily lowered stack, will be easy.

In other words, the dispensing action has been divided between a vertical series of ledges and, in contradistinction to prior dispensers which had a vertical series of ledges separated by recesses which permitted re-expansion of the rims, the present dispenser has no such recesses and does not permit re-expansion, but rather maintains the initial distortion until the secondary distortion is applied, thus making the secondary action easy. Not only is the action easier but the danger of injuring the rims by passing over a series of small ledges or steps is much less than if they had to pass over a single large step.

Preferably the upper ledges have a slight downward and inward taper on the inner upper edges to facilitate the passage of a cup rim into the space between the ribs. The lower ledges are made with edges which are less rounded to prevent the easy passage of the stack therethrough. The lower ledges are also thin vertically to prevent the passage of more than one rim at a time.

Figure 11 shows the action of the second form of dispenser. The full lines show the normal shape of a cup rim as it lies upon the upper ledges 21. The dotted line shows the shape of the rim after passing the first projections into the space between the ribs and the dot and dash line shows the shape of the rim as it passes the lower projections 20'.

The device has been described with particular reference to nesting paper cups but it may be employed for dispensing other articles for which it is adapted. The invention may have other embodiments within the scope of the subjoined claims.

I claim:

1. A dispensing device for articles with resilient beads, comprising a rigid tubular body member, a plurality of relatively narrow longitudinal rigid ribs spaced about the circumference of the inside of the member, said ribs being spaced apart circumferentially far enough and extending inward from the inner wall of the body member far enough to allow free outward distortion of the rim and being long enough axially to guide the beads of several articles, and abrupt ledges disposed below the upper ends of said ribs and arranged in a common trans-axial plane for supporting and segregating the articles, as they are dispensed, said ledges being rigid and integral with said ribs, and having flat horizontal surfaces without inclination extending over substantially their entire upper areas but being rounded on their upper inner edges sufficiently to eliminate sharpness.

2. A dispensing device as set forth in claim 1 in which said ledges are thinner than the space between adjacent beads on the articles.

3. A dispensing device for articles with resilient beads, comprising a rigid tubular body member for the passage of the articles, a plurality of circumferentially spaced longitudinal rigid ribs projecting inwardly from the interior surface of the tubular body, said ribs terminating at their upper ends in horizontal ledges with rounded inner edges adapted to support a stack of articles and separate the lowermost one when pulled out, said ribs having their inner surfaces disposed approximately on a cylinder which is slightly smaller than the outer circumference of the beads of the containers so as to have and maintain a slight binding action upon the beads, and ledges below the upper ends of and integral with the ribs extending inwardly a slight distance to provide a secondary dispensing action for the beads, said ledges being rigid and integral with said ribs, and having flat horizontal surfaces without inclination extending over substantially their entire upper areas but being rounded on their upper inner edges sufficiently to eliminate sharpness.

4. A dispensing device for articles with resilient beads, comprising a rigid tubular body member, a plurality of relatively narrow longitudinal ribs spaced about the circumference of the inside of the member, said ribs being spaced apart circumferentially far enough and extending inward from the inner wall of the body member far enough to allow free outward distortion of the rim and being long enough axially to guide the beads of several articles, the surfaces of the ribs lying in a circle which is slightly larger than the outer circumference of the rims of the articles so as to guide them without binding them, and ledges disposed below the upper ends of the ribs and arranged in a common trans-axial plane for supporting and dispensing the articles, said ledges being rigid and integral with said ribs and having flat horizontal surfaces without inclination extending over substantially their entire upper areas but being rounded on their upper inner edges sufficiently to eliminate sharpness.

5. A dispensing device as set forth in claim 1 in which three ribs and appurtenant dispensing elements are provided, two of the ribs being located relatively closely together adjacent the front of the dispenser and the third rib being spaced a greater distance from the front ribs than they are spaced apart and being disposed at the back of the dispenser.

EUGENE CONTI.